United States Patent [19]

Hewitt et al.

[11] 4,248,432

[45] Feb. 3, 1981

[54] GOLF BALL

[75] Inventors: Larry E. Hewitt, Vermilion; David T. Popovich, Lorain, both of Ohio

[73] Assignee: The B. F. Goodrich Company, Akron, Ohio

[21] Appl. No.: 57,633

[22] Filed: Jul. 16, 1979

[51] Int. Cl.³ .................... A63B 37/12; C08G 18/34
[52] U.S. Cl. .................... 273/235 R; 528/83; 273/DIG. 8
[58] Field of Search ................ 528/83; 273/235 R

[56] References Cited

U.S. PATENT DOCUMENTS

| | | | |
|---|---|---|---|
| 2,729,618 | 1/1956 | Mueller et al. | 273/235 R |
| 2,861,981 | 11/1958 | Frank et al. | 528/83 |
| 3,034,791 | 5/1962 | Gallagher | 528/63 |
| 3,979,126 | 9/1976 | Dusbiber | 273/235 R |

*Primary Examiner*—H. S. Cockeram
*Attorney, Agent, or Firm*—J. Hughes Powell, Jr.

[57] ABSTRACT

Golf balls are provided having a thermoplastic polyesterurethane cover comprising the reaction product of a polyester having a molecular weight from about 800 to 1500 reacted with para-phenylene diisocyanate or 1,4-cyclohexane diisocyanate, which is thereafter molded around a golf ball core.

5 Claims, No Drawings

GOLF BALL

BACKGROUND OF THE INVENTION

Naturally occuring balata is the standard for golf ball covers and is the standard in processability and properties for substitutes therefor. Unfortunately balata is expensive, difficult to obtain and since it occurs naturally, it presents problems in lack of uniformity from batch to batch. Many substitutes for balata have been proposed for golf ball covers. Among them has been the polyesterurethane described in U.S. Pat. No. 3,034,791 wherein a golf ball cover is described that is the reaction product of 1 mol of polytetramethyleneether glycol, 2 mols of an isomeric mixture of toluene-2,4-diisocyanate, and about 25 percent of toluene 2,6-diisocyanate, with 16 weight parts of 4,4'- methylene-bis (2-chloroanaline) as a curing or cross-linking agent. This material, patented in 1962, has several disadvantages. First, the curing agent is a toxic material. Second, as taught in the Patent, the handling time for the reaction product of the diisocyanate-polytetramethyleneether glycol is critical and results in handling problems in processing. The patent teaches that when short aging times are used, the golf ball cover stock may have poor golf ball core centering and thread show-through. When long aging times are involved, cover penetration of the stocks into thread intersticies is limited, resulting in poor cover adhesion, uneven compression, and the like. Improved materials for golf ball covers are an objective of this invention.

SUMMARY OF THE INVENTION

Improved golf balls and covers therefore are obtained when said cover comprises the reaction product of a polyester glycol of aliphatic gylcols containing 2 to 8 carbon atoms and aliphatic dicarboxylic acids containing 4 to 8 carbon atoms, and having a molecular weight of about 800 to 1500, reacted with about a molar equivalent, ie 0.96 to 1.02 mols of para-phenylene diisocyanate or cyclohexane diisocyanate in the substantial absence of curing or crosslinking agents to result in a thermoplastic, readily moldable golf ball cover stock.

DETAILED DESCRIPTION

The polyesters are readily prepared from aliphatic glycols containing 2 to 8 carbon atoms, including for example ethanediol, butanediol-1,4, hexanediol-1,6, and the like. The aliphatic dicarboxylic acids contain 4 to 8 carbon atoms including for example adipic, pimelic and suberic acids. Preferred polyesters are obtained from glycols and acids containing 4 to 6 carbon atoms, a prefered acid is adipic acid. The polyesters have molecular weights in the range of about 800 to 1500, usually about 850 to 1100. Golf ball cover stock with polyesters of about 2000 molecular weight normally do not have optimum physical properties.

The diisocyanates used are para-phenylene diisocyanate and 1,4-cyclohexane diisocyanate. Hexamethylene diisocyanate is not satisfactory, nor are the toluene diisocyanates. Improved golf ball cover stocks are obtained with polyurethanes from diphenylmethane- p,p'-diisocyanate, but such materials do not provide the optimum balance of desired properties as do para- phenylene diisocyanate and 1,4-cyclohexane diisocyanate. The molar ratios of diisocyanate to polyester is from about 0.96 to about 1.02 mols of diisocyanate per mol of polyester, preferably about 0.98 to about 1.0 mols of diisocyanate per mol of polyester.

The melting temperature of the resulting polyesterurethane is important to obtaining satisfactory results in improved golf ball covers, and must be greater than 70° C. up to about 110° C., preferably the melting point of the polyester urethane is in the range of about 75° to 100° C. measured by a differential scanning calorimeter. A particularly useful range is 80° to 90° C. The desired polyesterurethanes also have a melt index in the range of about 15 to 50.

The use of chain extenders in making the polyurethanes is not desired. For example, when small amounts of butanediol-1,4 are mixed with a polyester before reaction with the diisocyanate, or thereafter when an excess of diisocyanate is used with the polyester, the addition results in polyurethanes that do not have the desired balance of properties to provide good golf ball covers. Similarly, the use of curing or crosslinking agents is not desired because of the resulting handling difficulties in the plant, both in compounding and hold-up before molding, and since a thermoplastic polyurethane is then not obtained.

These polyesterurethanes may be used to make both 2 piece and 3 piece golf balls by any of the techniques now being used and well known in the golf ball art. The covers from the defined polyesterurethanes may be injection molded or compression molded, and in either case provide satisfactory golf balls having a satisfactory balance of good physical properties. In compression molding, for example, two separate pieces of the polyester urethanes are formed and then placed in a mold around the golf ball core at temperatures normally greater than about 250° F. to about 300° F. for about 5 minutes and allowed to cool down in the mold. 275° to 280° F. is the usual operating range.

In a typical preparation of a polyesterurethane useful as a golf ball cover, 450 weight parts of poly (tetramethylene adipate) glycol having a number average molecular weight of 957 and an acid number of 1.1 was heated to 104° C. While stirring, the molten polyester, 73.7 parts of p-phenylene diisocyanate was added. At this point compounding additives such as titanium dioxide and other pigments, processing aids as wax and molding aids such as fatty acid esters of dihydric alcohols may be added if desired. It is an advantage of these polyester urethanes that such aids are not necessary and in this example are not added. The resulting mixture was stirred for three minutes to 180° C. The polymer was poured onto a tray and allowed to cool. After one week, this polyesterurethane had a melt index of 18.3 determined according to ASTM D-1238,Procedure A, at a barrel temperature of 175° C., at 6 minute preheat, and a 2,160 piston load.

Samples of this polyester urethane were compression molded into half-shells and cooled. Thereafter the half-shells were positioned in a mold on either side of a golf ball core comprising a solid center and a rubber thread winding, and molded at 280° F. for 5 minutes and cooled in the mold. The resulting golf balls were found, as compared to balata covered three piece balls, to have equivalent and comparable compression, initial velocity, cut resistance, uniformity and paintability. An important advantage of the defined polyesterurethanes in painting is that no chemical pretreatment of the surface, or use of a primer was required to obtain satisfactory adhesion of the paint. The balls had satisfactory driving characteristics. This balance of desirable physical properties indicates excellent and uniform adhesion to the rubber threads of the golf ball cores. Balls were cut and it was found that there was excellent physical adhesion of the rubber threads to the inner surface of the defined polyesterurethane golf ball cover. If the adhesion to the rubber winding is not good, durability is harmed, the cover will distort and the balls tend to be "out of round" and have an undesirable loss of compression. It is one of the advantages of the polyester urethanes of this invention that excellent and uniform adhesion to the rubber winding is obtained without noticeable degradaton or destruction of these rubber windings.

Three piece golf balls, as is well known in the art, normally comprise solid or liquid centers, rubber thread windings and a cover. The polyesterurethanes of this invention are particularly useful in a three piece ball. The two piece ball normally comprises a solid core and a cover. Such core is normally a vulcanized rubber core. The polyesterurethanes of this invention provide satisfactory 2 piece golf balls and to demonstrate this the polyesterurethane described above is injection molded over a solid cured rubber core. The resulting ball is satisfactory.

In addition to the excellent adhesion to the core obtained with the defined polyesterurethanes, and paintability, these advantages were obtained using substantially the polyesterurethanes as is in a thermoplastic state without the necessity for adding the usual compounding ingredients, although they may be used if desired, titanium dioxide for example, and without a curing or crosslinking agent.

I claim:

1. A golf ball comprising a core and a polyesterurethane cover comprising the reaction product of a polyester of an aliphatic diol containing 2 to 8 carbon atoms and an aliphatic dicarboxylic acid containing 4 to 8 carbon atoms, said polyester having a molecular weight of about 800 to about 1500, reacted with para-phenylene diisocyanate or 1,4-cyclohexane diisocyanate in a molar ratio of 0.98 1.01 mols of diisocyanate per mol of polyester, said polyester-urethane having a melt index in the range of about 15 to 50.

2. A golf ball of claim 1 wherein said glycol and acid contains 4 to 6 carbon atoms, the polyester molecular weight is about 850 to 1,00, and the molar ratio of diisocyanate to polyester is 0.98 to 1.01.

3. A composition of claim 2 wherein the dicarboxylic acid is adipic acid, the diisocyanate is para-phenylene diisocyanate and the molar ratio of diisocyanate to polyester is 0.98 to 1.0.

4. A golf ball of claim 3 wherein said polyester is poly(tetramethylene adipate) having a molecular weight in the range of about 900 to 1,050 and the melt index is in the range of about 15 to 25.

5. A golf ball of claim 1 wherein said golf ball is a three piece golf ball comprising a liquid or solid center, rubber winding and said polyesterurethane as a cover therefor.

* * * * *